(12) United States Patent
Sugiura

(10) Patent No.: US 8,228,383 B2
(45) Date of Patent: Jul. 24, 2012

(54) IMAGE PICKUP APPARATUS AND METHOD FOR CONTROLLING RANGING AREA BASED ON DETECTED OBJECT

(75) Inventor: Mamoru Sugiura, Kanagawa (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 12/404,696

(22) Filed: Mar. 16, 2009

(65) Prior Publication Data

US 2009/0262230 A1    Oct. 22, 2009

(30) Foreign Application Priority Data

Apr. 21, 2008   (JP) .................................. 2008-110746
Dec. 22, 2008   (JP) .................................. 2008-325883

(51) Int. Cl.
  *H04N 5/225*   (2006.01)
  *H04N 5/232*   (2006.01)
  *G03B 13/00*   (2006.01)
  *G06K 9/00*    (2006.01)
(52) U.S. Cl. .......................... 348/169; 348/345; 382/118
(58) Field of Classification Search .................. 382/103; 348/169, 345
  See application file for complete search history.

(56) References Cited

U.S. PATENT DOCUMENTS

| | | | | |
|---|---|---|---|---|
| 5,243,418 A * | 9/1993 | Kuno et al. | ................... | 348/155 |
| 5,801,778 A * | 9/1998 | Ju | ........................... | 375/240.15 |
| 6,088,060 A * | 7/2000 | Suda et al. | ................... | 348/350 |
| 6,363,160 B1 * | 3/2002 | Bradski et al. | ................ | 382/103 |
| 6,404,455 B1 * | 6/2002 | Ito et al. | ....................... | 348/169 |
| 6,901,110 B1 * | 5/2005 | Tsougarakis et al. | ..... | 375/240.12 |
| 7,978,248 B2 * | 7/2011 | Terashima | ................ | 348/333.05 |
| 2002/0141615 A1 * | 10/2002 | Mcveigh et al. | .............. | 382/103 |
| 2003/0190058 A1 * | 10/2003 | Jun et al. | ....................... | 382/104 |
| 2003/0190059 A1 * | 10/2003 | Piccinelli et al. | ............. | 382/107 |
| 2004/0091158 A1 * | 5/2004 | Miled et al. | ................... | 382/236 |
| 2004/0101162 A1 * | 5/2004 | Higaki et al. | ................ | 382/103 |
| 2004/0257452 A1 * | 12/2004 | Chang et al. | ............. | 348/208.99 |
| 2005/0174451 A1 * | 8/2005 | Nozaki et al. | ............ | 348/240.99 |
| 2005/0270410 A1 * | 12/2005 | Takayama | ...................... | 348/345 |
| 2007/0014467 A1 * | 1/2007 | Bryll | ............................ | 382/152 |
| 2007/0165931 A1 * | 7/2007 | Higaki | .......................... | 382/128 |
| 2007/0236578 A1 * | 10/2007 | Nagaraj et al. | ........... | 348/208.99 |
| 2007/0273765 A1 * | 11/2007 | Wang et al. | ................... | 348/152 |

(Continued)

FOREIGN PATENT DOCUMENTS

JP        3-149512        6/1991

(Continued)

*Primary Examiner* — Aung S Moe
*Assistant Examiner* — Chia-Wei A Chen
(74) *Attorney, Agent, or Firm* — Oblon, Spivack, McClelland, Maier & Neustadt, L.L.P.

(57) ABSTRACT

An image pickup apparatus includes a motion amount detecting unit that detects an amount of motion of an object on the basis of an image signal of the object, a type information storage unit that stores a plurality of type information items used for detecting the type of the object, a type detecting unit that detects a type of the object on the basis of the stored type information items and the image signal of the object, a moving distance estimating unit that estimates a distance through which the object moves in an imaging screen on the basis of the detected amount of motion of the object and the object type detected by the type detecting unit, and a ranging area control unit that controls the size of a ranging area on the basis of the estimated distance through which the object moves in the imaging screen.

7 Claims, 13 Drawing Sheets

U.S. PATENT DOCUMENTS

| | | | |
|---|---|---|---|
| 2008/0101652 A1* | 5/2008 | Zhao et al. | 382/103 |
| 2008/0123747 A1* | 5/2008 | Lee et al. | 375/240.16 |
| 2008/0260206 A1* | 10/2008 | Kanda | 382/103 |
| 2009/0028385 A1* | 1/2009 | Cavallaro et al. | 382/103 |
| 2009/0080711 A1* | 3/2009 | Yokoi | 382/116 |
| 2009/0231446 A1* | 9/2009 | Lin | 348/208.4 |
| 2010/0045800 A1* | 2/2010 | Chebil et al. | 348/169 |
| 2010/0067741 A1* | 3/2010 | Stolkin et al. | 382/103 |
| 2010/0119162 A1* | 5/2010 | Liu et al. | 382/220 |

FOREIGN PATENT DOCUMENTS

| | | |
|---|---|---|
| JP | 5-328204 | 12/1993 |
| JP | 7-23272 | 1/1995 |
| WO | WO 2007077283 A1 * | 7/2007 |

* cited by examiner

IMAGE PICKUP APPARATUS AND METHOD FOR CONTROLLING RANGING AREA BASED ON DETECTED OBJECT

BACKGROUND OF THE INVENTION

1. Field of the Invention

The present invention relates to an image pickup apparatus and a ranging area control method for controlling the size of a ranging area in accordance with an amount of motion of an object.

2. Description of the Related Art

A moving object detecting function has been provided in order to perform a ranging operation on a moving object. For example, as a moving object detecting function, a method for switching areas used for detecting the motion of an object and performing a focusing operation (a ranging operation) (hereinafter referred to as "ranging areas") has been developed (refer to, for example, Japanese Unexamined Patent Application Publication No. 07-23272).

SUMMARY OF THE INVENTION

In existing moving object detecting functions, a ranging area can be switched and, therefore, the size of the ranging area can be changed. However, an operation for tracking an object moving in an imaging screen is not properly performed.

Accordingly, the present invention provides an image pickup apparatus and a ranging area control method that properly performs a tracking operation of a ranging area for an object moving in an imaging screen.

According to an embodiment of the present invention, an image pickup apparatus includes a motion amount detecting unit configured to detect an amount of motion of at least one object on the basis of an image signal of the object, a type information storage unit configured to store a plurality of type information items used for detecting the type of the object, a type detecting unit configured to detect the type of the object on the basis of the plurality of type information items stored in the type information storage unit and the image signal of the object, a moving distance estimating unit configured to estimate a distance through which the object moves in an imaging screen on the basis of the amount of motion of the object detected by the motion amount detecting unit and the type of the object detected by the type detecting unit, and a ranging area control unit configured to control a size of a ranging area on the basis of the distance through which the object moves in the imaging screen estimated by the moving distance estimating unit.

According to another embodiment of the present invention, an image pickup apparatus includes a motion amount detecting unit configured to detect an amount of motion of an object on the basis of an image signal of the object, a moving distance estimating unit configured to estimate a distance through which the object moves in an imaging screen on the basis of the amount of motion of the object detected by the motion amount detecting unit, and a ranging area control unit configured to control a size of a ranging area on the basis of the distance through which the object moves in the imaging screen estimated by the moving distance estimating unit.

According to still another embodiment of the present invention, a method for controlling a ranging area is provided. The method includes the steps of detecting an amount of motion of an object on the basis of an image signal of the object, estimating a distance through which the object moves in an imaging screen on the basis of the detected amount of motion of the object, and controlling a size of a ranging area on the basis of the estimated distance through which the object moves in the imaging screen.

According to the above-described embodiments of the present invention, the ranging area for a moving object can be accurately determined. As a result, the ranging operation on the object can be accurately performed.

DESCRIPTION OF THE PREFERRED EMBODIMENTS

Figure 1:
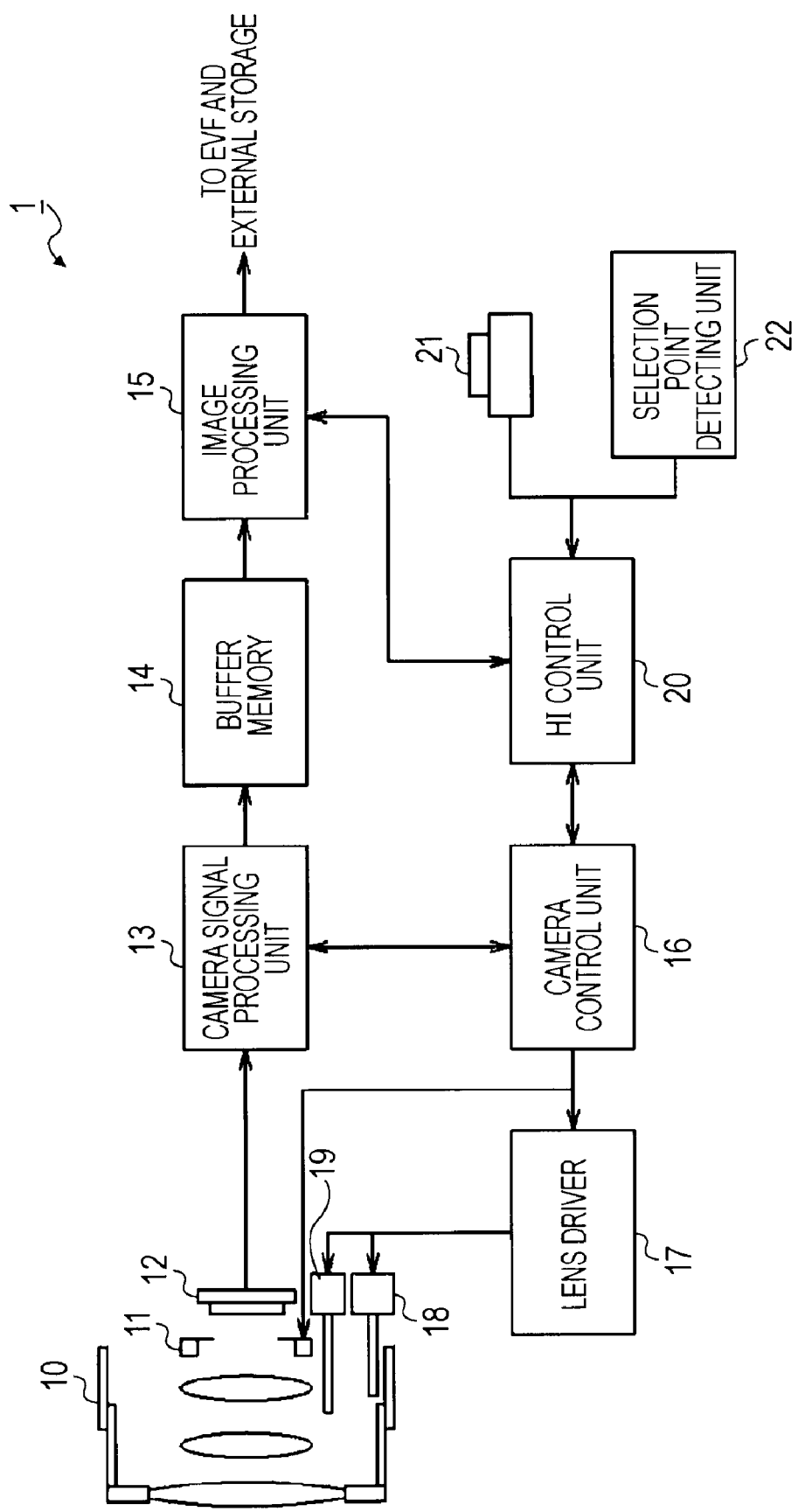
FIG. 1 is a block diagram illustrating an exemplary configuration of an image pickup apparatus according to an embodiment of the present invention.

Various exemplary embodiments of the present invention are described below with reference to the accompanying drawings. Note that descriptions are made in the following order:
1 Configuration of Image Pickup Apparatus
2 Configuration of Camera Signal Processing Unit
3 Configuration of Camera Control Unit
4-1 Ranging Area Control Method of Present Embodiment
4-2 Method for Computing Amount of Movement and Size of Ranging Frame
4-3 Particular Example of Method for Controlling Ranging Area
1 Configuration of Image Pickup Apparatus An exemplary configuration of an image pickup apparatus 1 is described next with reference to FIG. 1. The image pickup apparatus 1 includes an optical system 10, an exposure drive unit 11, an image pickup element 12, a camera signal processing unit 13, a buffer memory 14, an image processing unit 15, a camera control unit 16, a lens driver 17, a motor 18, a motor 19, a human interface (HI) control unit 20, a shutter button 21, and a selection point detecting unit 22.

The optical system 10 includes, for example, a lens. An object image is made incident on the optical system 10. The exposure drive unit 11 appropriately controls exposure of the object image made incident on the optical system 10 so as to generate incident light with an appropriate exposure. The incident light is supplied to the image pickup element 12.

For example, the image pickup element 12 is formed from a charge coupled device (CCD) or a complementary metal oxide semiconductor (CMOS). The image pickup element 12 converts a light signal based on the object image supplied from the exposure drive unit 11 into an electrical signal (i.e., performs photoelectric conversion). The image pickup element 12 then supplies, to the camera signal processing unit 13, the electrical signal generated through the photoelectric conversion.

The camera signal processing unit 13 receives the photoelectrically converted electrical signal from the image pickup element 12. The camera signal processing unit 13 performs a predetermined process on the electrical signal supplied from the image pickup element 12 and generates an image signal. The camera signal processing unit 13 performs, for example, a linear matrix process, a white balance process, and a γ correction process. The camera signal processing unit 13 then supplies the generated image signal to the image processing unit 15 via the buffer memory 14. In addition, the camera signal processing unit 13 supplies information necessary for camera control to the camera control unit 16.

The image processing unit 15 performs image processing selected for the intended use on the image signal supplied from the buffer memory 14. For example, the image processing unit 15 performs image processing, such as color tone correction and luminance correction, generates a video signal, and performs an encoding process. The image processing unit 15 supplies an image signal generated through predetermined image processing to the HI control unit 20, a recording unit (not shown), and an electronic viewfinder (EVF). The recording unit includes, for example, a semiconductor memory, a hard disk, a magnetooptical disk, or an optical disk.

The camera control unit 16 drives the motor 18 and the motor 19 via the lens driver 17 on the basis of the information supplied from the camera signal processing unit 13 and the HI control unit 20 so as to control the position of the lens. Thus, the camera control unit 16 performs focus control and focal length control. More specifically, the camera control unit 16 computes camera control parameters, such as a focus control parameter and a focal point control parameter on the basis of a detection result supplied from a detection circuit 132 (described below) of the camera signal processing unit 13. Thereafter, the camera control unit 16 performs the focus control and the focal point control on the basis of the computed control parameters. In addition, the camera control unit 16 performs exposure control using the exposure drive unit 11 on the basis of information supplied from the camera signal processing unit 13 and the HI control unit 20.

Furthermore, as described in more detail below, the camera control unit 16 detects an amount of motion of an object, estimates a distance through which the object moves on the basis of the detected amount of motion of an object, and controls the size of a ranging area on the basis of the estimated distance through which the object moves. That is, the camera control unit 16 controls the size of a ranging area so that the ranging area encompasses the distance through which the object moves. Accordingly, since the image pickup apparatus 1 can accurately determine the ranging area for the moving object, the image pickup apparatus 1 can accurately perform a ranging operation.

For example, the HI control unit 20 receives an image signal from the image processing unit 15, the control information from the camera control unit 16, recording start/stop information from the shutter button 21, and information from the selection point detecting unit 22. The HI control unit 20 detects the position selected by the selection point detecting unit 22. In addition, the HI control unit 20 supplies control information to the image processing unit 15 on the basis of, for example, the information received from the shutter button 21. Thus, data recording is controlled.

The shutter button 21 is a switch that a user can operate. For example, the shutter button 21 has a two-position switch structure. The shutter button 21 supplies information regarding start and stop of recording of an image to the HI control unit 20.

The selection point detecting unit 22 is a member used for selecting an object image to be displayed on a display unit, such as an EVF (not shown). The display unit displays image data supplied from the image processing unit 15. The selection point detecting unit 22 is composed of, for example, a touch panel. The selection point detecting unit 22 is disposed on the display unit in an overlaying manner. The selection point detecting unit 22 supplies coordinate information indicating a selected point to the HI control unit 20.

2 Configuration of Camera Signal Processing Unit

Figure 2:
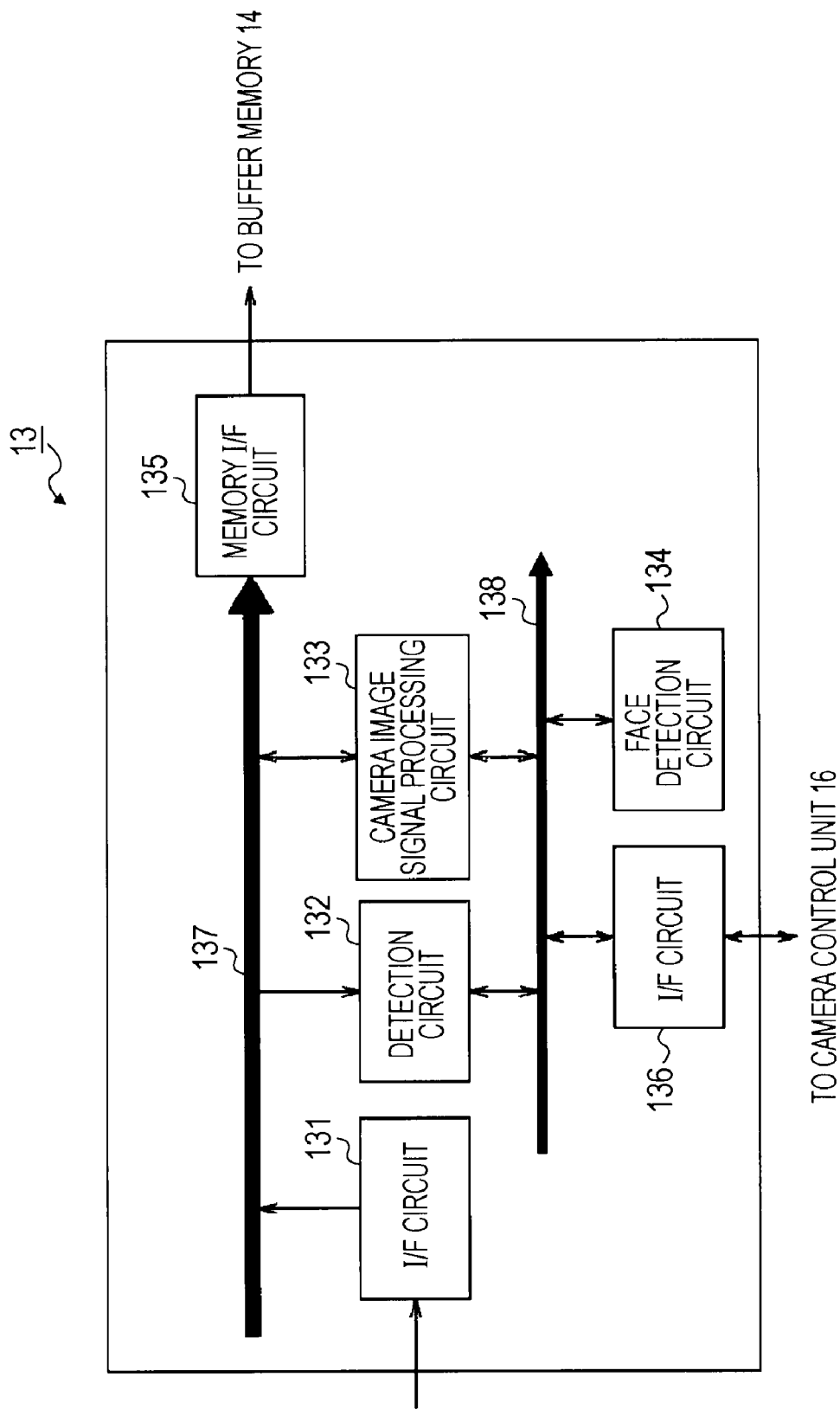
FIG. 2 is a block diagram illustrating an exemplary configuration of a camera signal processing unit of the image pickup apparatus according to the embodiment.

An exemplary configuration of the camera signal processing unit 13 is described in detail next. As shown in FIG. 2, the camera signal processing unit 13 includes an I/F circuit 131, the detection circuit 132, a camera image signal processing circuit 133, a face detection circuit 134, a memory I/F circuit 135, and an I/F circuit 136.

The I/F circuit 131 receives the electrical signal photoelectrically converted by the image pickup element 12 shown in FIG. 1. The I/F circuit 131 supplies the photoelectrically converted electrical signal to the detection circuit 132 and the camera image signal processing circuit 133 connected to a bus 137.

The detection circuit 132 receives, from the I/F circuit 131, the electrical signal photoelectrically converted by the image pickup element 12. The detection circuit 132 performs a predetermined detection process on the electrical signal supplied from the I/F circuit 131. The detection circuit 132 then supplies the detection result to the camera control unit 16 via the I/F circuit 136.

The camera image signal processing circuit 133 receives, from the I/F circuit 131, the electrical signal photoelectrically converted by the image pickup element 12. The camera image signal processing circuit 133 performs predetermined image processing on the electrical signal supplied from the I/F circuit 131 and generates an image signal. For example, the camera image signal processing circuit 133 performs camera signal processing, such as a linear matrix process, a white balance process, and a γ correction process. The camera image signal processing circuit 133 then supplies the generated image signal to the face detection circuit 134 and the memory I/F circuit 135.

The face detection circuit 134 receives the image signal from the camera image signal processing circuit 133. The face detection circuit 134 performs a face detection process on the basis of the image signal supplied from the camera image signal processing circuit 133. The face detection circuit 134 then supplies the result of the face detection to the camera control unit 16 via the I/F circuit 136. For example, the face detection circuit 134 performs the face detection process using an existing technique, such as a color determination process of a captured image.

The memory I/F circuit 135 supplies, to the buffer memory 14, the image signal supplied from the camera image signal processing circuit 133. The I/F circuit 136 is connected to the detection circuit 132, the camera image signal processing circuit 133, and the face detection circuit 134 via a bus 138. For example, the I/F circuit 136 supplies, to the detection circuit 132, the ranging area control information output from the camera control unit 16.

3 Configuration of Camera Control Unit

Figure 3:
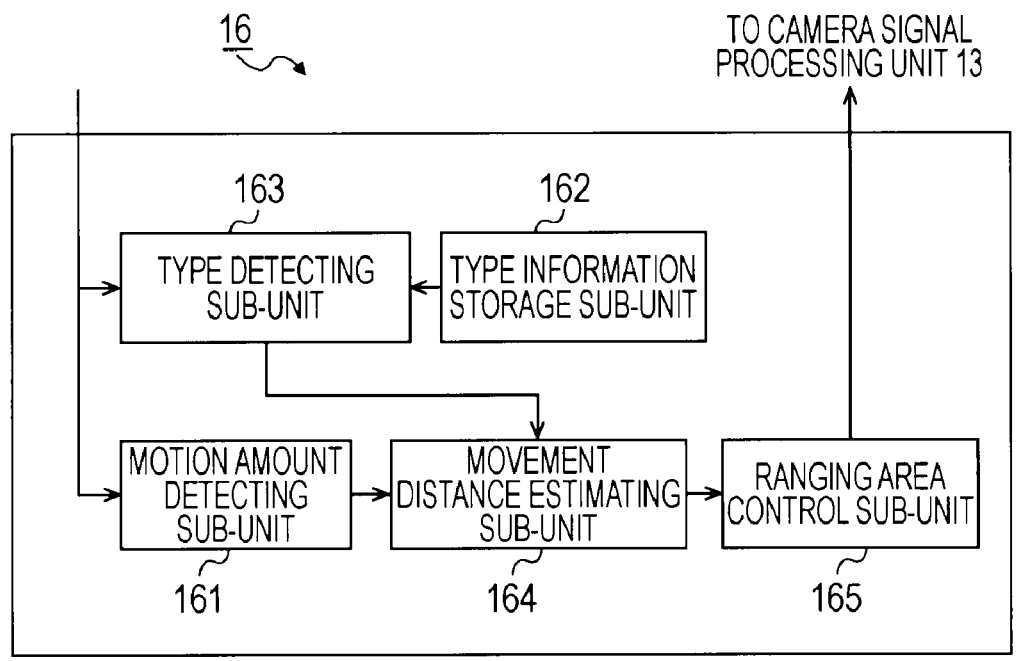
FIG. 3 is a block diagram illustrating an exemplary configuration of a camera control unit of the image pickup apparatus according to the embodiment.

An exemplary configuration of the camera control unit 16 is described next with reference to FIG. 3. That is, the camera control unit 16 includes a motion amount detecting sub-unit 161, a type information storage sub-unit 162, a type detecting sub-unit 163, a movement distance estimating sub-unit 164, and a ranging area control sub-unit 165. While the present embodiment is described with reference to the configuration of the camera control unit 16 shown in FIG. 3, the configuration is not limited thereto. For example, the camera control unit 16 may realize the functions of such hardware using software.

The motion amount detecting sub-unit 161 detects the amount of movement of the object on the basis of the image signal of the object. For example, the motion amount detecting sub-unit 161 detects a motion vector (the amount of motion and the direction of the motion) of the image on the basis of the image signal supplied from the camera signal processing unit 13. The motion amount detecting sub-unit 161 then supplies information regarding the detected movement amount of the object to the movement distance estimating sub-unit 164.

For example, the motion amount detecting sub-unit 161 determines whether the amount of movement of the object is greater than or equal to a half of the size of the current detection area of the object. If the amount of movement of the object is greater than or equal to a half of the size of the current detection area of the object, the motion amount detecting sub-unit 161 supplies the information regarding the detected movement amount of the object to the movement distance estimating sub-unit 164. In addition, if the amount of movement of the object is less than a half of the size of the current detection area of the object, the motion amount detecting sub-unit 161 directly supplies the current coordinate information to the detection circuit 132 of the camera signal processing unit 13 in order to increase the processing speed. Note that, in a mode in which a focusing operation is performed by touching the selection point detecting unit 22, the motion amount detecting sub-unit 161 may detect the amount of movement of the object on the basis of the coordinate information detected by the selection point detecting unit 22 and received from the HI control unit 20.

The type information storage sub-unit 162 stores a plurality of type information items used for detecting the object type. Examples of the type information items stored in the type information storage sub-unit 162 include information regarding a movable object, such as a human face, a human body, the age of a human, a vehicle, and an animal. The type information storage sub-unit 162 supplies these type information items to the type detecting sub-unit 163.

The type detecting sub-unit 163 detects the object type on the basis of the type information items stored in the type information storage sub-unit 162 and the image signal of the object supplied from the camera signal processing unit 13. The type detecting sub-unit 163 then supplies the detection result regarding the object type to the movement distance estimating sub-unit 164.

In recent years, cameras having a function in which a ranging area tracks an object using a face detection function has been developed. However, in general, the movements differ in accordance with the object type. Accordingly, in order to improve the accuracy of a ranging operation on the object, it is desirable to correct the estimated movement amount in accordance with the object type. Therefore, the type detecting sub-unit 163, for example, detects the object type, such as a human face, a human body, the age of a human, a vehicle, and an animal, on the basis of the image signal of the object supplied from the camera signal processing unit 13 and the type information stored in the type information storage sub-unit 162.

For example, the case where it is determined whether an object is an adult or a child is described next. The type detecting sub-unit 163 normalizes a face image output from the face detection circuit 134 using the positions of the right and left eyes as a reference position. The type detecting sub-unit 163 then extracts the luminance values at certain points of the normalized face image. The luminance serves as the feature of the normalized face image. Thereafter, the type detecting sub-unit 163 determines whether the object is an adult or a child on the basis of the luminance values at certain points of the face image and the information stored in the type information storage sub-unit 162. In this example, the positions of two eyes are used for the reference position. However, another part of the face other than the eyes may be used for the reference position. For example, the position of a nose included in the face image may be used for the reference position. Alternatively, a plurality of parts of the face, such as the two eyes and nose, may be used for the reference position.

Figure 4:
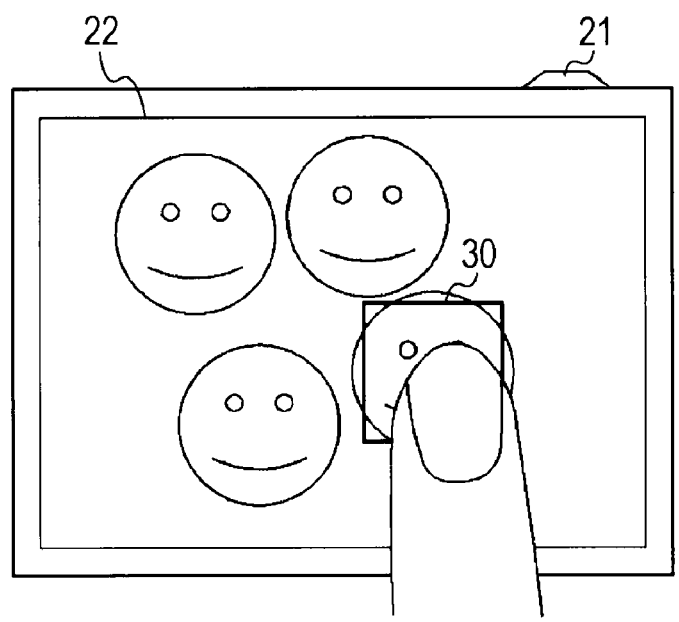
FIG. 4 illustrates an example of a display screen of the image pickup apparatus according to the embodiment.

The movement distance estimating sub-unit 164 receives the amount of motion of the object detected by the motion amount detecting sub-unit 161 and the type information about the object detected by the type detecting sub-unit 163. The movement distance estimating sub-unit 164 estimates a distance through which the object moves on the basis of the amount of motion of the object and the type information about the object. The movement distance estimating sub-unit 164 then supplies the estimation result to the ranging area control sub-unit 165. For example, the operation performed by the movement distance estimating sub-unit 164 when, as shown in FIG. 4, the face of the object detected by the selection point detecting unit 22 is selected and a frame 30 tracks the face of the object is described next. Note that the frame 30 indicates a target area of a focusing operation performed in accordance with detection appropriately performed after the face is selected. In such a case, the movement distance estimating sub-unit 164 limits the estimated amount of motion so that the estimated amount of motion is within a range of an estimated speed of a human face moving in the screen.

In addition, the movement distance estimating sub-unit 164 corrects the estimated amount of motion in the imaging screen in accordance with the type detection result received from the type detecting sub-unit 163. For example, if the face of the object detected by the type detecting sub-unit 163 indicates a younger age or if the object type is an animal, the movement distance estimating sub-unit 164 corrects the estimated amount of motion in accordance with strenuous movement. In such a case, the ranging frame may move in a direction in which the object moves and in the opposite direction. Accordingly, the movement distance estimating sub-unit 164 sets a relatively large ranging frame. That is, since the object may move in a direction opposite to the direction in which the object is currently moving, the movement distance estimating sub-unit 164 sets the ranging frame over a wide area. In addition, it is highly likely that a vehicle moves at high speed, but the moving direction is a certain direction. Accordingly, if the detected object is a vehicle, the movement distance estimating sub-unit 164 may estimate the movement in a certain direction, in general.

By correcting the amount of motion of the object in accordance with the object type, the image pickup apparatus 1 can accurately limit the ranging area for a moving object, and therefore, the image pickup apparatus 1 can perform a further accurate ranging operation.

Alternatively, the movement distance estimating sub-unit 164 may correct the estimated moving distance of the object in accordance with a focal length. In general, as a focal length increases, image blur due to camera shake tends to occur more easily. Accordingly, the amount of motion of the object in a screen increases. Consequently, the movement distance estimating sub-unit 164 takes into account the focal length. For example, when a focal length is increased, that is, when a zoom-in operation is performed, the movement distance estimating sub-unit 164 estimates a relatively large amount of motion. In contrast, when a focal length is decreased, that is, when a wide-angle operation is performed, the amount of motion of the object in the screen is relatively small. Therefore, the movement distance estimating sub-unit 164 estimates a relatively small amount of motion of the object, as compared with the case of a long focal length. In this way, by correcting the estimated amount of motion of the object in accordance with the focal length, the movement distance estimating sub-unit 164 can improve the accuracy of the estimated amount of motion of the object. Note that the above-described process performed by the movement distance estimating sub-unit 164 may be performed by the ranging area control sub-unit 165, as described below.

The ranging area control sub-unit 165 receives the estimation result from the movement distance estimating sub-unit 164. The ranging area control sub-unit 165 controls the position and size of a ranging area indicating an area for which a focusing operation is performed on the basis of the estimated distance through which the object moves. That is, the ranging area control sub-unit 165 controls the position and size of the ranging area so that the ranging area encompasses the estimated distance through which the object moves.

Subsequently, the ranging area control sub-unit 165 supplies, to the detection circuit 132 of the camera signal processing unit 13, control parameters including the determined position and size of the ranging area.

4-1 Ranging Area Control Method of Present Embodiment

A method for controlling a ranging area according to the present embodiment is described next by comparing the method with an existing method for controlling a ranging area in the case where a human face serving as an object is tracked.

Figure 5A:
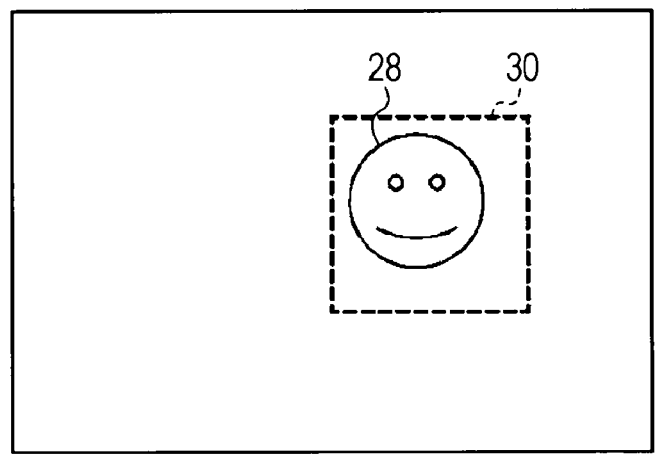
FIGS. 5A to 5C are diagrams illustrating an existing method for controlling a ranging area.
Figure 5B:
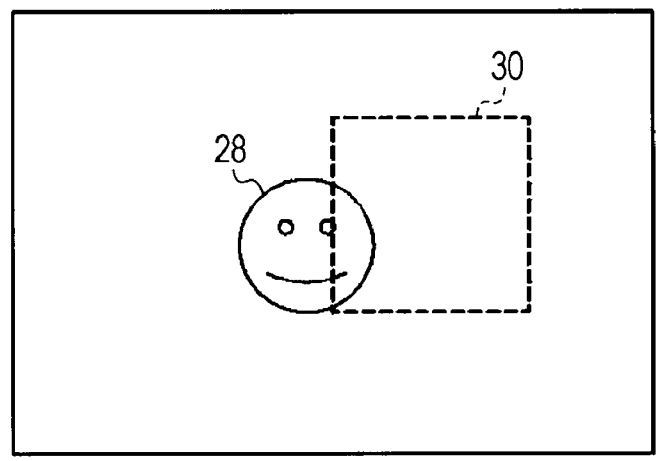
Figure 5C:
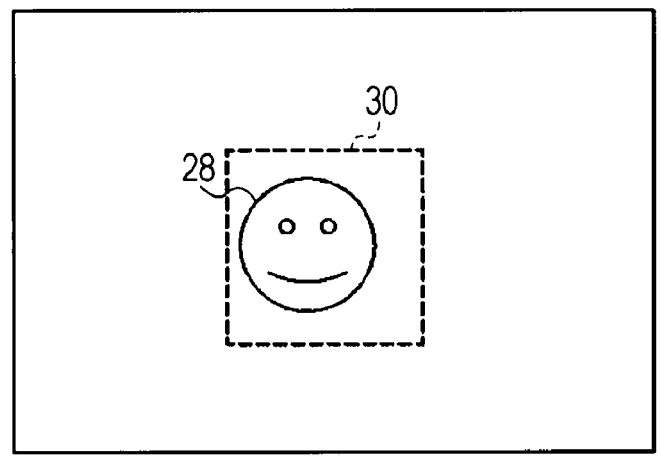

An existing method for controlling a ranging area is described first with reference to FIGS. 5A to 5C. As shown in FIG. 5A, a face 28 serving as an object is detected, and the frame 30 is determined so as to surround the face 28. In this existing method for controlling a ranging area, an area surrounded by the frame 30 serves as an area for which a focusing operation is performed (a ranging area). Subsequently, as shown in FIG. 5B, the face 28 moves. At that time, as shown in FIG. 5C, the face 28 is detected again, and the frame 30 is displayed.

As described above, in the existing method, since the area surrounded by the frame 30 is set to a ranging area, it is difficult to perform the detection process during a time period from the time the face 28 starts moving, as shown in FIG. 5B, to the time the frame 30 is displayed again as shown in FIG. 5C. That is, in the existing method, when the detection process is performed, much time is necessary, and it is difficult to accurately perform focus control while the object is moving.

Therefore, in the method for controlling a ranging area according to the present embodiment, a distance through which an object moves is estimated on the basis of an amount of motion of the object and the type (the attribute) of the object. Thereafter, the position and the size of the ranging area are controlled on the basis of the estimation result. The method for controlling a ranging area according to the present embodiment is described next with reference to FIGS. 6A to 6C.

Figure 6A:
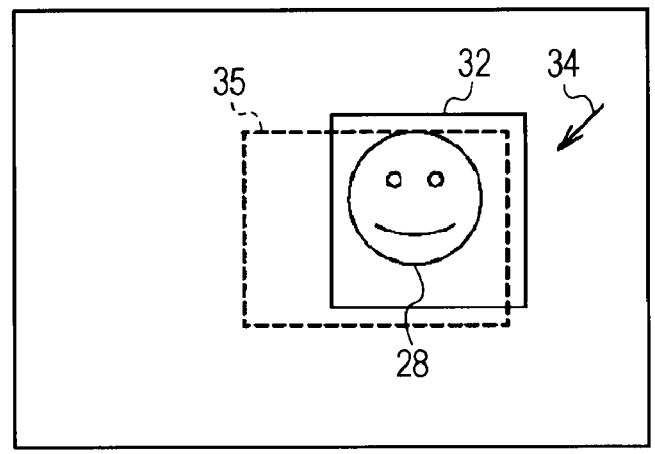
FIGS. 6A to 6C are diagrams illustrating an exemplary method for controlling a ranging area according to the embodiment.
Figure 6B:
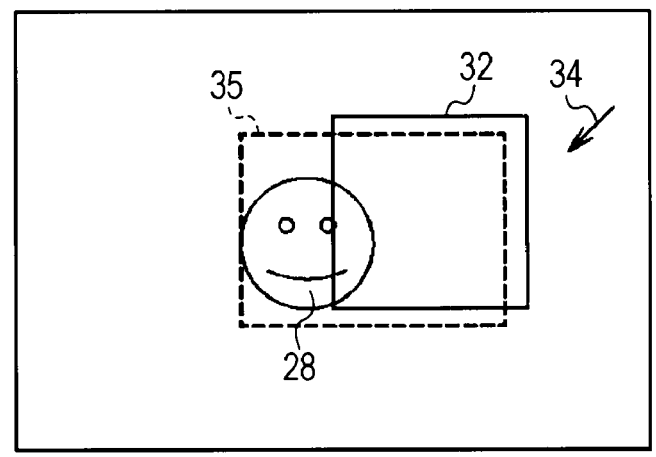
Figure 6C:
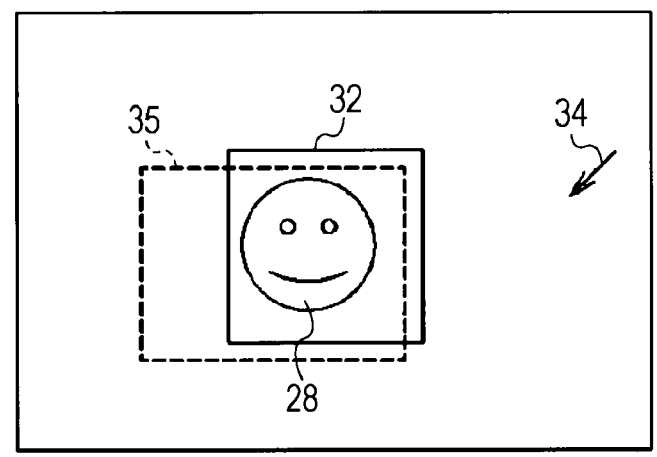

For example, as shown in FIG. 6A, the camera control unit 16 detects the face 28 serving as an object and determines a detection frame 32 so that the detection frame 32 surrounds the face 28. In addition, as shown in FIG. 6A, the camera control unit 16 detects a motion vector 34 of the face 28 in a unit time ΔT and sets a ranging frame 35 indicating a ranging area for the next unit time ΔT on the basis of the motion vector 34 and the object type. A method for setting the ranging frame 35 is described in more detail below. Subsequently, when, as shown in FIG. 6B, the face 28 moves, the camera control unit 16 detects the face 28 again and sets the detection frame 32, as shown in FIG. 6C. In FIG. 6C, the camera control unit 16 then sets the ranging frame 35 indicating the next ranging area on the basis of the detected motion vector 34 and the object type.

In this way, in the method for controlling a ranging area according to the present embodiment, by setting the ranging frame 35 for the next unit time ΔT on the basis of the detected motion vector 34 and the object type, the detection process can be performed in real time, as shown in FIG. 6A. In addition, in the method for controlling a ranging area according to the present embodiment, by using information regarding the type of the detected object for the next ranging process, the ranging area can be more accurately estimated for the next unit time ΔT. Consequently, according to the method for controlling a ranging area of the present embodiment, a more accurate focusing operation can be provided, as compared with that using existing methods.

An example of a ranging area control process performed by the image pickup apparatus 1 is described next with reference to the flowchart shown in FIG. 7.

In step S10, the camera control unit 16 starts processing for determining a ranging area. For example, when the shutter button 21 is pressed in a mode in which the ranging area is changed in accordance with an amount of motion of the object, the camera control unit 16 starts a ranging operation.

In step S11, the camera control unit 16 acquires coordinate information. More specifically, the camera control unit 16 acquires, for example, the position and size for which detection is to be performed as the coordinate information. Note that, immediately after the camera control unit 16 starts processing for determining a ranging area, the camera control unit 16 acquires predetermined initial information. In the subsequent processing, the camera control unit 16 acquires the immediately previous coordinate information, that is, information regarding the position and size of the immediately previous ranging area.

In step S12, the camera control unit 16 determines whether the object has been detected. If the camera control unit 16 determines that the object has been detected, the processing proceeds to step S13. However, if the camera control unit 16 determines that the object has not been detected, the processing proceeds to step S16.

In step S13, the camera control unit 16 determines whether the amount of motion of the object is greater than or equal to a predetermined value. More specifically, if the camera control unit 16 determines that the amount of motion of the object is greater than or equal to a predetermined value using the motion amount detecting sub-unit 161 ("Yes" in step S13), the processing proceeds to step S14. However, if the camera control unit 16 determines that the amount of motion of the object is less than the predetermined value using the motion amount detecting sub-unit 161 ("No" in step S13), the processing proceeds to step S16. Note that the camera control unit 16 may perform the process in step S13 after the process in step S21 shown in FIG. 8 (described below) is performed.

In step S14, the camera control unit 16 estimates an amount of movement of the object which is a target of the ranging operation on the basis of the amount of motion of the object. For example, the movement distance estimating sub-unit 164 estimates a distance through which the object moves in an imaging screen on the basis of the amount of motion of the object supplied from the motion amount detecting sub-unit 161. More specifically, as described in more detail below, the camera control unit 16 computes the amount of movement of the ranging frame and the size of the next ranging frame.

In step S15, the camera control unit 16 adds the estimated amount of movement to the coordinates of the ranging area. That is, the ranging area control sub-unit 165 changes the coordinates and the size of the ranging area on the basis of the distance through which the object moves in the imaging screen (the distance estimated by the movement distance estimating sub-unit 164).

In step S16, the camera control unit 16 outputs the coordinate information to the detection circuit 132. That is, the camera control unit 16 outputs the coordinates of the ranging area obtained in step S15 to the detection circuit 132.

In step S17, the camera control unit 16 completes the process for determining the ranging area of the object.

In this way, the image pickup apparatus 1 can more accurately limit the ranging area for a moving object, as compared with the case in which the ranging frame tracks an object using an existing moving object detecting function. Accordingly, the image pickup apparatus 1 can perform a more accurate ranging operation.

The process performed in step S14 shown in FIG. 7, that is, an exemplary process for estimating the amount of motion of an object performed by the camera control unit 16, is described next with reference to the flowchart shown in FIG. 8.

In step S20, the camera control unit 16 starts estimating the amount of motion of the object.

In step S21, the camera control unit 16 determines whether the object type has been detected. If the type detecting sub-unit 163 has detected the object type ("Yes" in step S21), the processing proceeds to step S22. However, if the object type has not been detected ("No" in step S21), the processing proceeds to step S23.

In step S22, the camera control unit 16 corrects the estimated amount of movement in accordance with the object type. More specifically, as described in more detail below, for example, by changing a parameter in accordance with the object type, the camera control unit 16 corrects the estimated amount of movement. For example, if the object is a child, the amount of motion is greater than that of an adult, in general. Accordingly, the movement distance estimating sub-unit 164 corrects the estimated amount of motion in the positive direction, that is, in the direction in which the object is currently moving. In this way, by correcting the estimated amount of movement in accordance with the object type, the movement distance estimating sub-unit 164 can improve the accuracy of estimation of the motion.

In step S23, the camera control unit 16 corrects the estimated amount of movement of the object in accordance with the focal length using the movement distance estimating sub-unit 164. In this way, by correcting the estimated amount of movement of the object in accordance with the focal length, the camera control unit 16 can improve the accuracy of estimation regarding the amount of movement of the object.

Figure 7:
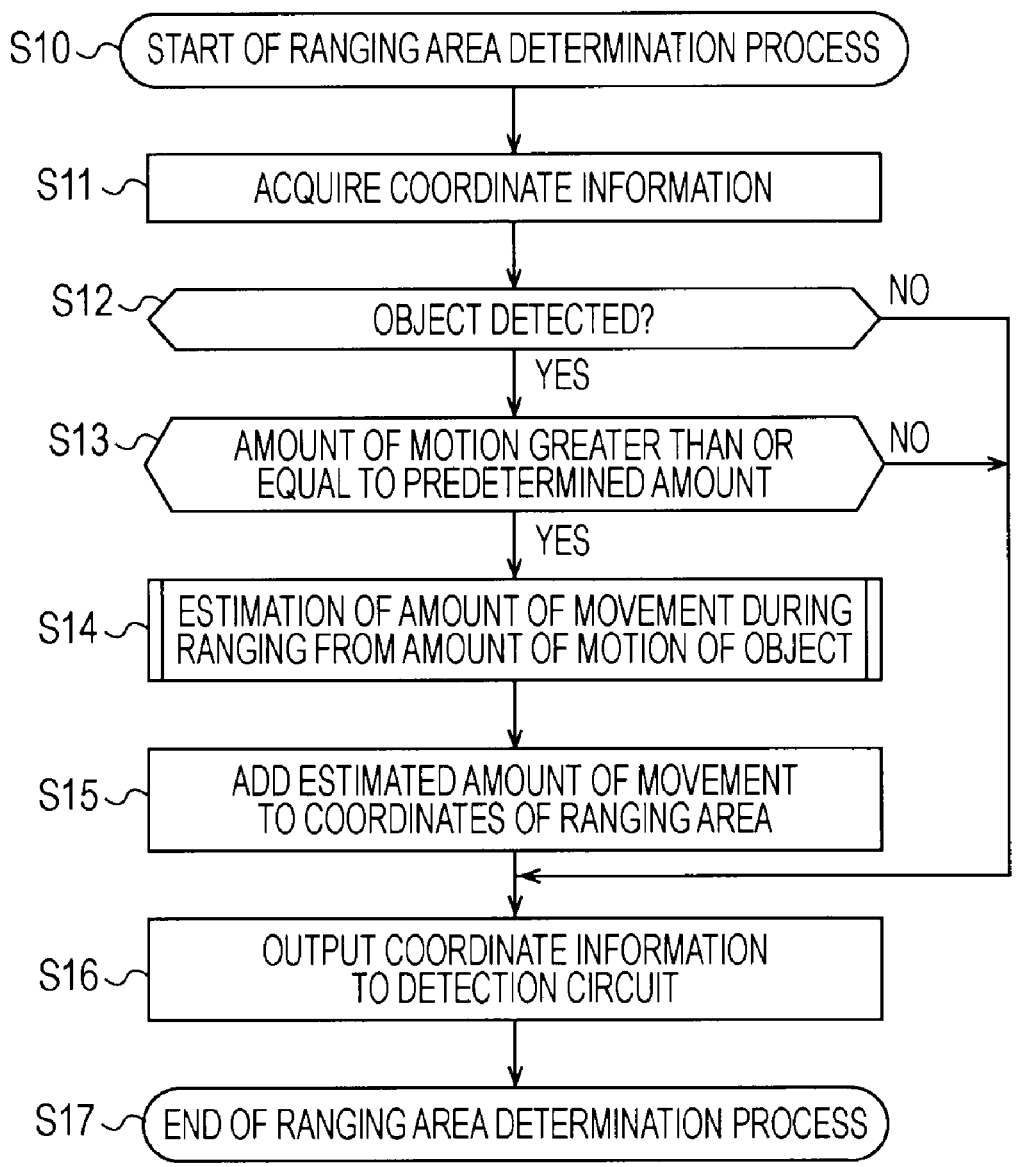
FIG. 7 is a flowchart illustrating an example of a ranging area control process according to the embodiment.
Figure 8:
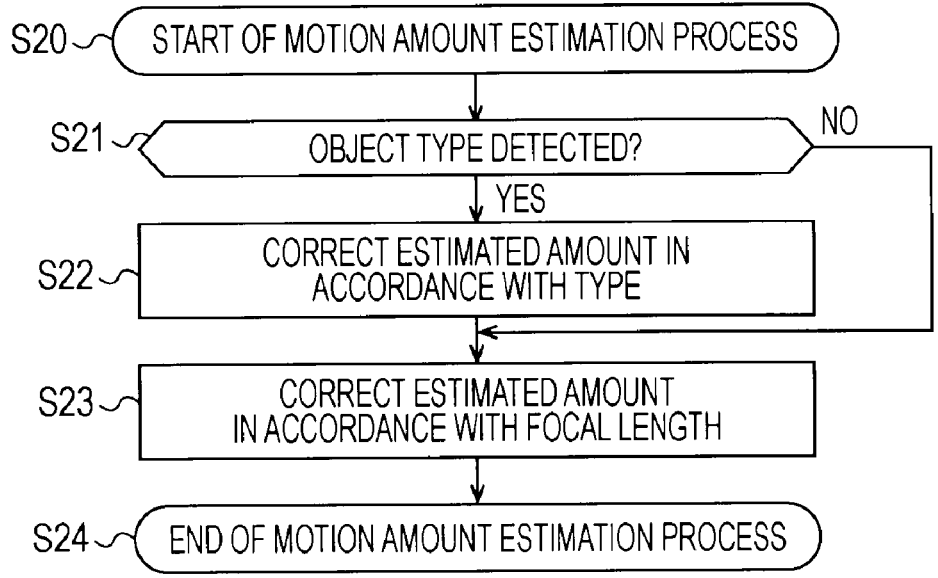
FIG. 8 is a flowchart illustrating an exemplary motion amount estimating process according to the embodiment.

While the above description has been made with reference to the processing performed by the camera control unit 16 for estimating the amount of motion shown in FIG. 8 in which the estimated amount of motion is corrected in accordance with the detected object type, the processing is not limited to such processing. For example, in step S12 shown in FIG. 7, the camera control unit 16 may detect the object type in addition to the object.

4-2 Method for Computing Amount of Movement and Size of Ranging Frame

Figure 9:
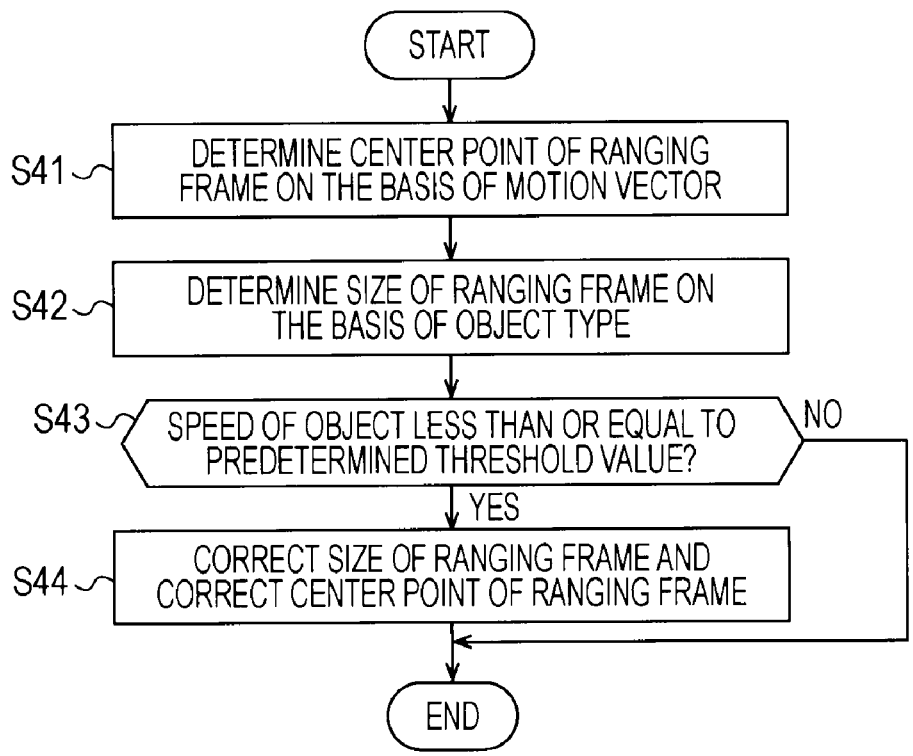
FIG. 9 is a flowchart illustrating an exemplary method for determining an amount of movement of a ranging frame and the size of the ranging frame according to the embodiment.

An exemplary method for computing the amount of movement and the size of the ranging frame in step S14 shown in FIG. 7 is described next with reference to the flowchart shown in FIG. 9.

Figure 10:
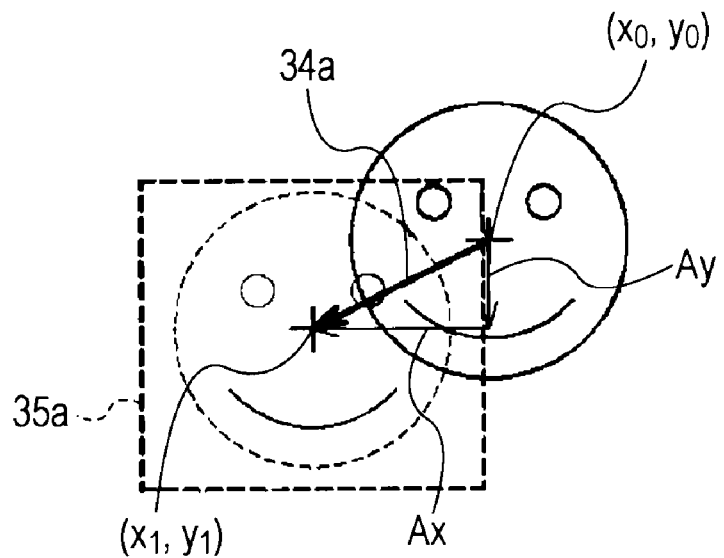
FIG. 10 is a diagram illustrating an exemplary method for determining the center coordinates of a ranging frame according to the embodiment.

In step S41, the camera control unit 16 determines the coordinates of the center of the next ranging frame on the basis of the motion vector of the object. For example, as shown in FIG. 10, let the right horizontal direction represent the positive direction of the x-axis, the downward vertical direction represent the positive direction of the y-axis, and $(x_0, y_0)$ denote the coordinates of the center of the object. Then, the camera control unit 16 determines the coordinates of the center of the ranging frame in the following manner. That is, the camera control unit 16 determines the coordinates $(x_1, y_1)$ of the center of a ranging frame 35a estimated for the next unit time $\Delta T$ using a motion vector 34a for the current unit time $\Delta T$ and the following equations:

$$x_1 = x_0 + aA_x - \text{sgn}(A_x)c \quad (1)$$

$$y_1 = y_0 + bA_y - \text{sgn}(A_y)d \quad (2)$$

In equations (1) and (2), $A_x$ represents a motion vector in the x direction, and $A_y$ represents a motion vector in the y direction. "a", "b", and "c" are constant values. The constant values can be changed in accordance with the object type. sgn($A_x$) and sgn($A_y$) represent signum functions, which return one of values 1, −1, and 0 in accordance with the signs of $A_x$ and $A_y$. For example, when $A_x$>0, sgn($A_x$)=1. When $A_x$=0, sgn($A_x$)=0. When $A_x$<0, sgn($A_x$)=−1.

Figure 11:
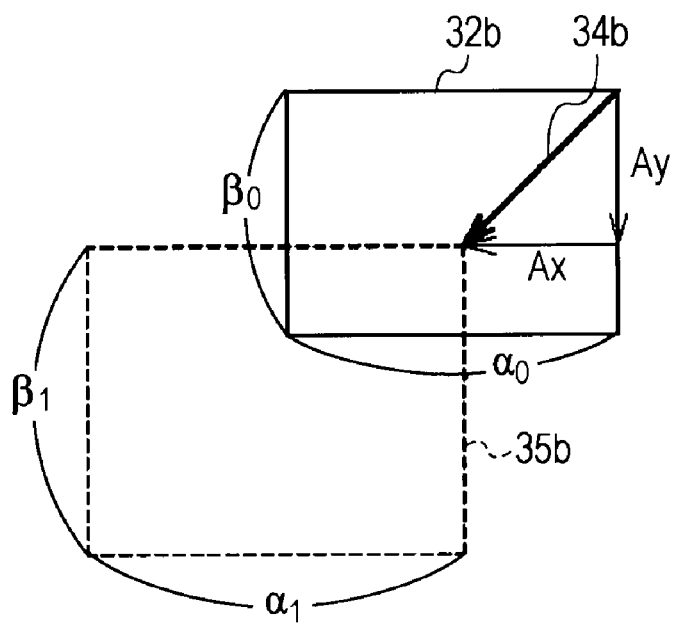
FIG. 11 is a diagram illustrating an exemplary method for determining the size of a ranging frame according to the embodiment.

In step S42, the camera control unit 16 determines the size of the ranging area on the basis of the object type. As shown in FIG. 11, let $\alpha_0$ denote the length of a detection frame 32b of the object in the x-axis direction (the horizontal direction), and let $\beta_0$ denote the length of the detection frame 32b in the y-axis direction (the vertical direction). Then, the camera control unit 16 determines $\alpha_1$ and $\beta_1$ of an estimated ranging frame 35b in the next unit time ΔT using a motion vector 34b in the unit time ΔT and the following equations:

$$\alpha_1 = \alpha_0 + e|A_x|e|A_x| \geq 0 \qquad (3)$$

$$\beta_1 = \beta_0 + f|A_y|f|A_y| \geq 0 \qquad (4)$$

In equations (3) and (4), $A_x$ represents a motion vector in the x-axis direction, and $A_y$ represents a motion vector in the y-axis direction. "e" and "k" are constant values. For example, "e" and "k" can be changed in accordance with the object type.

In place of equations (3) and (4), the camera control unit 16 may determine $\alpha_1$ and $\beta_1$ of the ranging frame 35b by using the following equations:

$$\alpha_1 = \alpha_0 + g(|A_x|+1)g(|A_x|+1) \geq 1 \qquad (5)$$

$$\beta_1 = \beta_0 + h(|A_y|+1)h(|A_y|+1) \geq 1 \qquad (6)$$

In equations (5) and (6), $A_x$ represents a motion vector in the x-axis direction, and $A_y$ represents a motion vector in the y-axis direction. "g" and "h" are constant values. For example, "g" and "h" can be changed in accordance with the object type.

In step S43, the camera control unit 16 determines whether the moving speed of the object is less than or equal to a predetermined threshold value. For example, the camera control unit 16 determines whether the moving speed of the object is less than or equal to a predetermined threshold value by the amount of movement of the object in the imaging screen per unit time ΔT. If the moving speed of the object is less than or equal to a predetermined threshold value ("Yes" in step S43), the processing performed by the camera control unit 16 proceeds to step S44. However, if the moving speed of the object is greater than the predetermined threshold value ("No" in step S43), a series of the processes are completed. Note that the process performed in step S43 corresponds to the process performed in step S13 illustrated in FIG. 7.

In step S44, the camera control unit 16 corrects the coordinates of the center of the ranging frame and the size of the ranging frame.

As described above, according to the present embodiment, by determining the next ranging area on the basis of the detected motion vector and the object type, the detection process can be performed in real time. In addition, according to the method for controlling a ranging area of the present embodiment, by using information regarding the object type for the next ranging operation, the ranging area for the next unit time ΔT can be further accurately determined.

Figure 12:
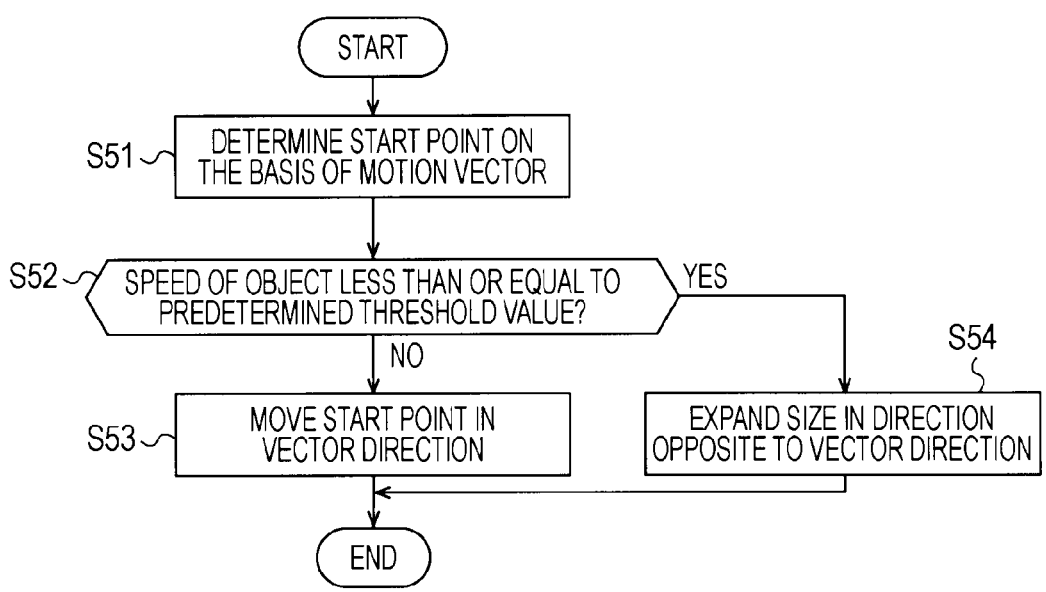
FIG. 12 is a flowchart illustrating an exemplary method for determining an amount of movement of a ranging frame and the size of the ranging frame according to the embodiment.

Furthermore, according to the method for controlling a ranging area of the present embodiment, the next ranging area may be determined by using an end portion of the ranging frame of the object as the reference coordinates. An exemplary processing method for determining the next ranging area when the end portion of the ranging frame of the object is used as the reference coordinates is described next with reference to the flowchart shown in FIG. 12.

In step S51, the camera control unit 16 determines the coordinates of the ranging area serving as a reference used when determining the start point, that is, the position and/or the size of the next ranging frame, on the basis of the motion vector. For example, as shown in FIG. 13, if the camera control unit 16 detects a detection frame 32c and a motion vector 34c, the camera control unit 16 determines that the coordinates ($x_0$, $y_0$) of the end portion of the detection frame 32c in a direction opposite to the object moving direction are the reference coordinates.

In step S52, the camera control unit 16 determines whether the moving speed of the object is less than or equal to a predetermined threshold value. If the moving speed of the object is greater than a predetermined threshold value ("No" in step S52), the processing proceeds to step S53. However, if the moving speed of the object is less than or equal to the predetermined threshold value ("Yes" in step S52), the processing proceeds to step S54. The process performed in step S52 corresponds to the process performed in step S43 illustrated in FIG. 9.

Figure 13:
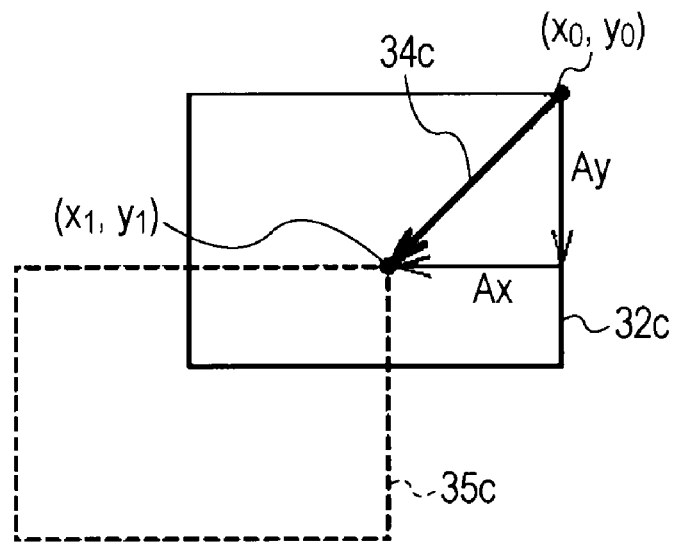
FIG. 13 is a diagram illustrating an exemplary method for determining the size of a ranging frame according to the embodiment.

For example, let the right horizontal direction be the positive x-axis direction, and let the downward vertical direction be the positive y-axis direction, as shown in FIG. 13. Then, in step S53, the camera control unit 16 determines the reference coordinates of the ranging frame in the following manner. That is, the camera control unit 16 determines the coordinates ($x_1$, $y_1$) of the start point of a ranging frame 35c estimated in the next unit time ΔT using the motion vector 34c in the unit time ΔT and equations (1) and (2).

In step S54, the camera control unit 16 expands the size of the ranging frame in a direction opposite to the vector direction of the motion vector.

Figure 14:
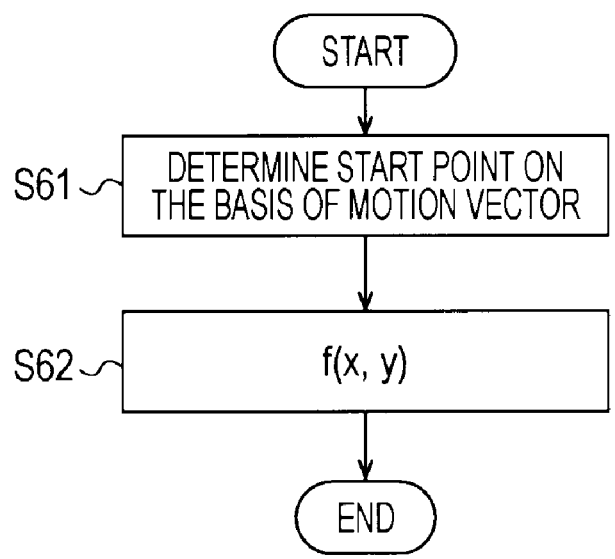
FIG. 14 is a flowchart illustrating an exemplary method for determining the size of a ranging frame according to the embodiment.

A method for determining the size of the ranging frame using the end portion of the detection frame as the reference coordinates is described next with reference to the flowchart shown in FIG. 14.

In step S61, the camera control unit 16 determines, on the basis of the motion vector, the start point, that is, the reference coordinates used when changing the size. The process performed in step S61 corresponds to the process performed in step S51 illustrated in FIG. 12.

In step S62, the camera control unit 16 computes the size of a ranging frame estimated in the next unit time ΔT using the object type and the motion vector in the unit time ΔT. For example, as in the same manner performed in step S42 shown in FIG. 9, the camera control unit 16 computes the size of the ranging frame using equations (3) and (4) or using equations (5) and (6).

4-3 Particular Example of Method for Controlling Ranging Area

A method for controlling a ranging area of the present embodiment in accordance with the object type is described with reference to FIGS. 15 to 20.

Figure 15:
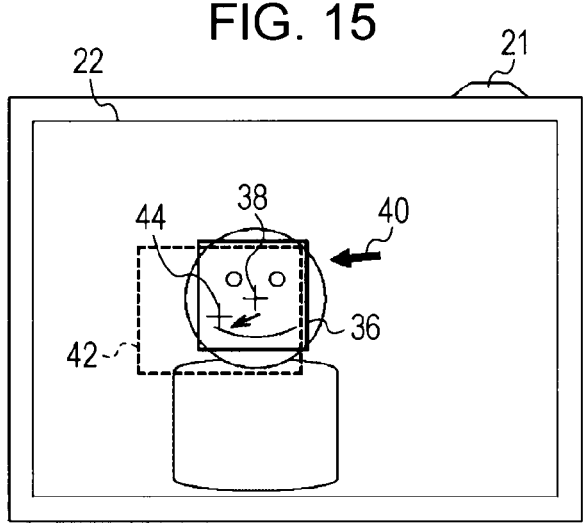
FIG. 15 is a diagram illustrating an exemplary processing operation performed by the camera control unit when the camera control unit tracks a human face.

An exemplary operation performed by the camera control unit 16 when the camera control unit 16 tracks a human face serving as an object is described first with reference to FIG. 15. As in the above-described case in which the camera control unit 16 tracks an animal, when the tracking target is, for example, a human face, the camera control unit 16 detects a human face serving as an object in the form of a detection frame 36 and a center 38 of the detection frame 36. In addition, when a motion vector 40 in a unit time ΔT is detected, the camera control unit 16 moves a center 44 of a ranging frame 42 representing a ranging area estimated to be present in the next unit time ΔT in accordance with the motion vector 40.

For example, the ranging area control sub-unit 165 moves the coordinates of the center of the ranging frame 42 estimated to be present in the next unit time ΔT using the motion vector 40 and equations (1) and (2).

In addition, in order to expand the ranging frame 42 including the center 44 in accordance with the motion vector 40 so that the ranging frame 42 is larger than the detection frame 36, the camera control unit 16 multiplies the height and the width of the detection frame 36 by a coefficient that is varied in accordance with the amount of motion of the object. For example, the ranging area control sub-unit 165 varies the coefficient used when determining the ranging frame 42 using equations (3) and (4) or using equations (5) and (6). Furthermore, since the face serving as an object may be directed in the opposite direction when, for example, the amount of motion of the object is small, the ranging area control sub-unit 165 may expand the ranging frame 42 in the opposite direction, as illustrated in step S54 of FIG. 12.

Figure 16:
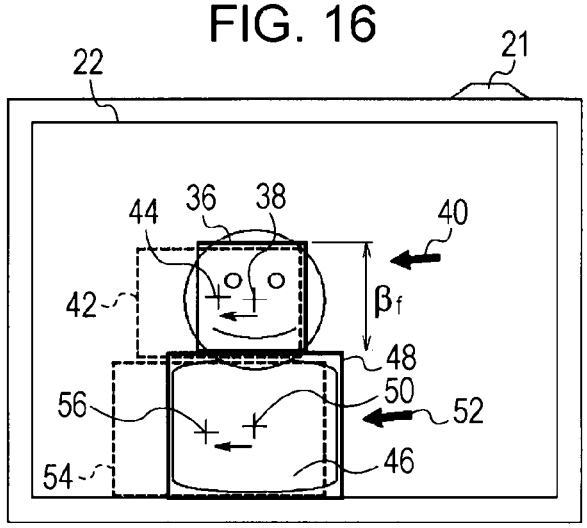
FIG. 16 is a diagram illustrating an exemplary processing operation performed by the camera control unit when the camera control unit tracks the human face and the human body.
Figure 17:
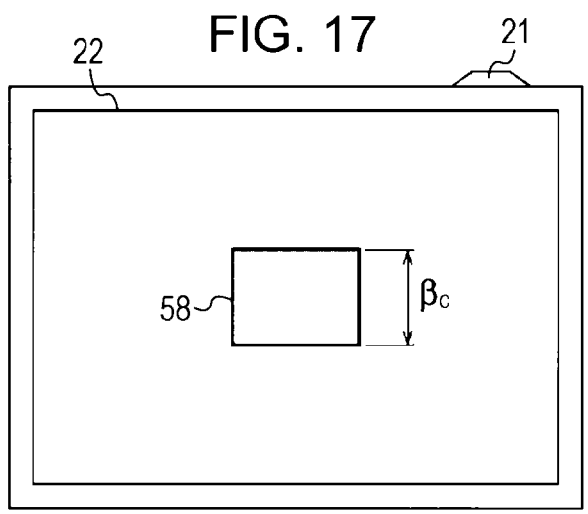
FIG. 17 is a diagram illustrating a fixed AF frame.

An exemplary operation performed by the camera control unit 16 when the camera control unit 16 tracks a human body serving as an object is described next with reference to FIG. 16. The same numbering will be used in describing FIG. 16 as was utilized above in describing FIG. 15, and the descriptions thereof are not repeated. For example, the camera control unit 16 detects a human body 46 serving as an object in the form of a detection frame 48 and a center 50 of the detection frame 48. Subsequently, when a motion vector 52 in a unit time ΔT is detected, the ranging area control sub-unit 165 moves a center 56 of a ranging frame 54 estimated to be present in the next unit time ΔT in accordance with the motion vector 52. In addition, in order to expand the ranging frame 54 having the center 56 in accordance with the motion vector 52 so that the ranging frame 54 is larger than the detection frame 48, the ranging area control sub-unit 165 multiplies the height and the width of the ranging frame 54 by a coefficient that is varied in accordance with the amount of motion of the human body 46.

When the object is the human body, the amount of motion in the horizontal direction is relatively larger than that in the vertical direction. In addition, the length of the detection frame 48 in the vertical direction is increased. Therefore, the ranging area control sub-unit 165 may significantly decrease the coefficient for equations (3) and (4) or the coefficient for equations (5) and (6). Alternatively, the ranging area control sub-unit 165 may stop multiplying the height of the ranging frame 54 by the coefficient. Furthermore, when the amount of motion of the object is small, the human body serving as an object may move in a direction opposite to the moving direction. Therefore, the ranging area control sub-unit 165 may expand the ranging frame 54 in the direction opposite to the moving direction as well.

Still furthermore, when a plurality of objects are detected, the movement distance estimating sub-unit 164 may assign weights to the objects in accordance with the sizes of the objects. For example, as shown in FIG. 16, when the camera control unit 16 detects the human face and the human body at the same time, the movement distance estimating sub-unit 164 takes into account the motion vector 40 of the detection frame 36 in a unit time ΔT and the motion vector 52 of the detection frame 48 in the unit time ΔT and determines the ranging frame 42 and the ranging frame 54 in the next unit time ΔT.

As an example, a method for controlling a ranging area when the detection frame 36 is smaller than an AF frame 58 having a normal fixed size (refer to FIG. 17) is described next. For example, if a length βf of the detection frame 36 in the height direction is smaller than a length βc of the AF frame 58 in the height direction, it is desirable that the movement distance estimating sub-unit 164 assigns a weight to the motion vector 52 instead of simply averaging the motion vector 40 and the motion vector 52. As noted above, when the length βf of the detection frame 36 in the height direction is smaller than the length βc of the AF frame 58 in the height direction, the movement distance estimating sub-unit 164 considers that the reliability of the detection accuracy of the detection frame 36 is lower than that of the detection frame 48. In this way, a computation cost for a ranging operation can be reduced. In addition, when the length βf of the detection frame 36 in the height direction detected by the movement distance estimating sub-unit 164 is smaller than the length βc of the AF frame 58 in the height direction, the ranging area control sub-unit 165 may determine the amounts and directions of movement of the ranging frame 42 and the ranging frame 54 by using only the motion vector 52.

In addition, in the case in which only the human face is present, only the human body is present, or both human face and body are present, if the camera control unit 16 can detect whether the object is an adult or a child, the camera control unit 16 may use the detection result when determining a motion vector of the ranging frame in the next ΔT. For example, when the object is a child, the amount of movement is relatively large, and the moving direction is easily changed. Accordingly, a larger ranging frame in the next ΔT may be set by the ranging area control sub-unit 165, as compared with the case where the object is an adult. In addition, when the object is a child, it is highly likely that the object moves in a direction opposite to the moving direction. Therefore, the ranging area control sub-unit 165 may expand the ranging frame 42 and the ranging frame 54 in the next ΔT in the direction opposite to the moving direction as well.

Furthermore, even when an object can be detected, the following cases may arise: the case in which the object is small, the case in which it is difficult to determine the size or shape of the object, such as the human body or an animal, and the case in which, since a large number of objects are detected, it is desirable that the detected objects are considered as a group. In such cases, for example, by changing the size and position of the ranging frame using the center of the screen of a touch panel (i.e., the selection point detecting unit 22) as a reference, the ranging area control sub-unit 165 can reduce a computation cost for a ranging operation. For example, when a large number of humans are detected, the ranging area control sub-unit 165 may change the size and the position of the ranging frame in accordance with the distribution of the humans in the screen and the amounts of motion. As described above, when the object is a human, it is highly likely that movement in the horizontal direction frequently occurs. Accordingly, it is desirable that the ranging area control sub-unit 165 increases the width of the ranging frame more significantly than the height of the ranging frame.

Figure 18:
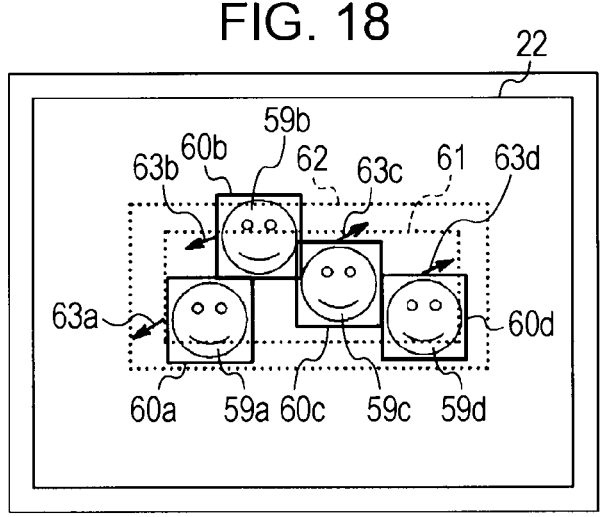
FIG. 18 is a diagram illustrating an exemplary processing operation performed by the camera control unit when a plurality of human faces are detected.

More specifically, the method for controlling a ranging area when a plurality of human faces are detected is described with reference to FIG. 18. For example, when a plurality of human faces 59a to 59d are detected and if frames 60a to 60d are set to the human faces 59a to 59d, respectively, the ranging area control sub-unit 165 sets a ranging frame 61 that includes the human faces 59a to 59d. In such a case, the ranging area control sub-unit 165 may set the ranging frame 61 so that the ranging frame 61 includes all of the human faces 59a to 59d. However, in order to reduce, for example, the effect of focus movement to the background, all of the human faces 59a to 59d are not necessarily included in the ranging frame 61. In addition, when the human faces 59a to 59d have motion vectors 63a to 63d in the unit time ΔT, respectively, the ranging area control sub-unit 165 can set a ranging frame 62 in the next unit time ΔT so that the ranging frame 62 includes the motion vectors 63a to 63d.

Figure 19:
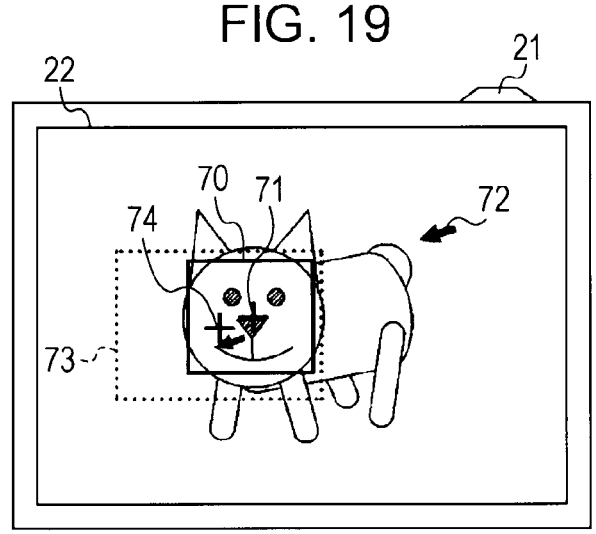
FIG. 19 is a diagram illustrating an exemplary processing operation performed by the camera control unit when the camera control unit tracks an animal.

An exemplary operation performed by the camera control unit 16 when the camera control unit 16 tracks an animal is described next with reference to FIG. 19. For example, when an animal serving as an object is detected in the form of a detection frame 70 and a center 71 of the detection frame 70 and if a motion vector 72 in the unit time ΔT is present, the ranging area control sub-unit 165 moves a center 74 of a detection frame estimated to be present in the next ΔT in accordance with the motion vector 72. In addition, in order to expand a ranging frame 73 having the center 74 in the next ΔT to a size larger than the detection frame 70 in accordance with the motion vector 72, the ranging area control sub-unit 165 multiplies the height and the width of the detection frame 70 by a coefficient that is varied in accordance with the amount of motion of the animal. When, for example, the amount of motion of the object is small, the animal serving as an object may move in a direction opposite to the moving direction. Therefore, the ranging area control sub-unit 165 may expand the ranging frame 73 in the direction opposite to the moving direction as well.

Figure 20:
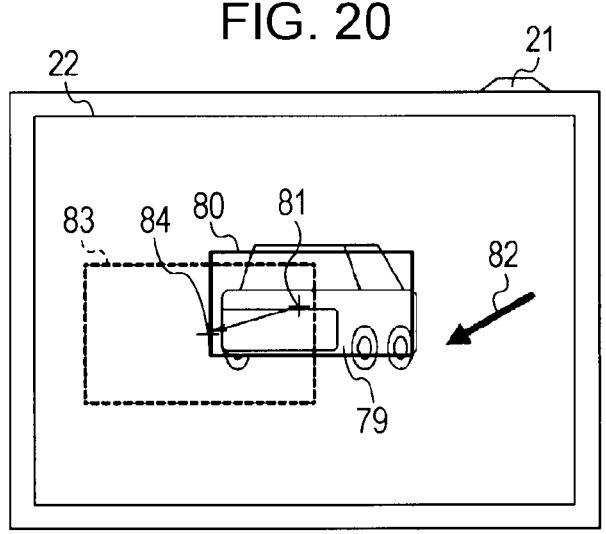
FIG. 20 is a diagram illustrating an exemplary processing operation performed by the camera control unit when the camera control unit tracks a vehicle.

An exemplary operation performed by the camera control unit 16 when the camera control unit 16 tracks a vehicle serving as an object is described next with reference to FIG. 20. For example, the type detecting sub-unit 163 detects a vehicle 79 on the basis of templates of a vehicle in the front-back direction and the left-right direction stored in the type information storage sub-unit 162. Subsequently, when the vehicle 79 is detected in the form of a detection frame 80 and a center 81 of the detection frame 80 and if a motion vector 82 of the vehicle 79 in the unit time ΔT is detected, the ranging area control sub-unit 165 moves, in accordance with the motion vector 82, a center 84 of a ranging frame 83 estimated to be present in the next ΔT. In addition, in order to expand the ranging frame 83 in the next ΔT to a size larger than the detection frame 80 in accordance with the amount of motion, the ranging area control sub-unit 165 multiplies the height and the width of the ranging frame 83 by a coefficient that is varied in accordance with the amount of motion. Here, the speed of an object like a vehicle is high. In such a case, a difference between a motion vector in a certain unit time and a motion vector in the next unit time is small, and the object does not rapidly move in the opposite direction. Therefore, it is not necessary for the ranging area control sub-unit 165 to expand the ranging frame 83 to a size larger than the amount of motion of the vehicle 79.

As described above, the image pickup apparatus 1 controls the position and the size of the ranging area of the object using the ranging area control sub-unit 165 so that the ranging area includes the distance of movement of the object estimated by the movement distance estimating sub-unit 164. Accordingly, the image pickup apparatus 1 can accurately limit the ranging area for a moving object. That is, even when, for example, an image is captured under the condition that the level of a high-frequency component of the background is high, that is, when an image is captured under the condition that the contrast of the background is high, blur caused by lack of focus or focusing on a background subject can be prevented. Consequently, the image pickup apparatus 1 can accurately performed the ranging operation.

Figure 21:
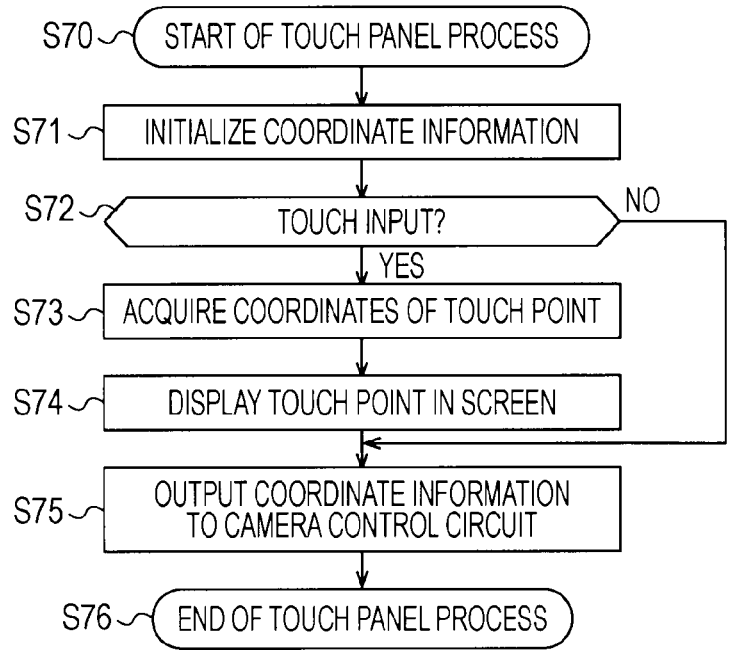
FIG. 21 is a flowchart illustrating an exemplary touch panel process performed by the image pickup apparatus according to the embodiment.

An exemplary object selection process performed when a touch panel is used for the selection point detecting unit 22 is described next with reference to the flowchart shown in FIG. 21.

In step S70, if the image pickup apparatus 1 is in a mode in which a focusing operation is performed using a touch of a screen, the HI control unit 20 starts a touch panel process.

In step S71, the HI control unit 20 initializes the coordinate information. That is, the HI control unit 20 initializes an internal coordinate information buffer.

In step S72, the HI control unit 20 determines whether a touch operation is performed on the touch panel. More specifically, if a touch operation is performed ("Yes" in step S72), the processing of the HI control unit 20 proceeds to step S73. However, if a touch operation is not performed ("No" in step S72), the processing proceeds to step S75.

In step S73, the HI control unit 20 acquires the coordinates of the position of a touched point in the touch panel.

In step S74, the HI control unit 20 displays a mark at the point at which the touch occurs. For example, as shown in FIG. 4, the HI control unit 20 displays the frame 30 indicating the target area of a focusing operation in accordance with the position of a point in the touch panel at which touch occurs.

In step S75, the HI control unit 20 outputs the coordinate information to the camera control unit 16. More specifically, if, in step S72, the HI control unit 20 determines that the touch panel is not touched, touch coordinate information is not present. Accordingly, the HI control unit 20 outputs the initialized information to the camera control unit 16. Note that, in addition to the coordinate information, the HI control unit 20 may set a flag indicating whether touch occurred and output the flag to the camera control unit 16. Thus, the HI control unit 20 may send, to the camera control unit 16, information as to whether touch occurred.

In step S76, the HI control unit 20 completes the touch panel process.

Figure 22:
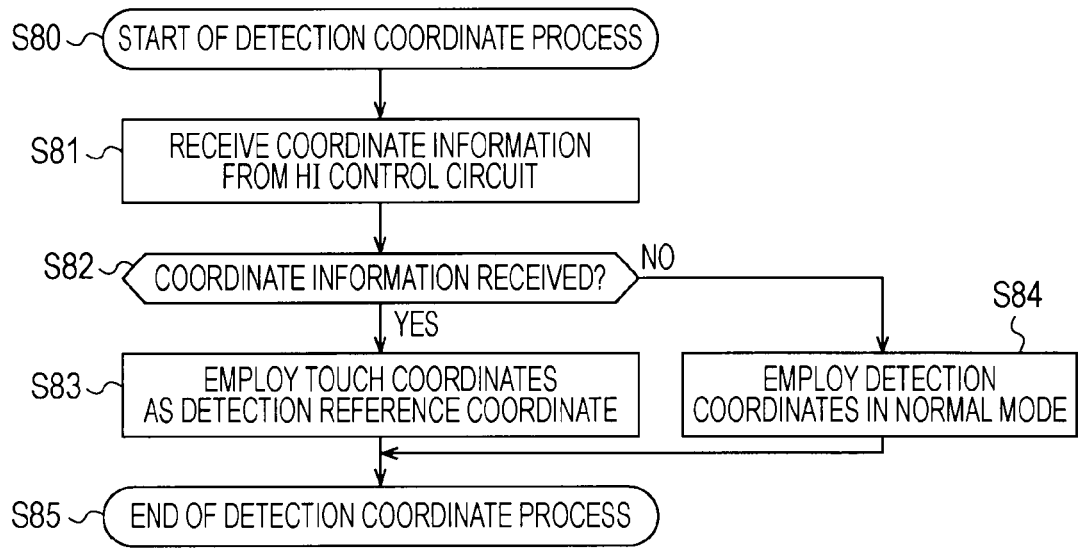
FIG. 22 is a flowchart illustrating a detection coordinate process performed by the image pickup apparatus according to the embodiment.

An exemplary detection coordinate process performed by the camera control unit 16 that acquired the coordinate information from the HI control unit 20 is described next with reference to the flowchart shown in FIG. 22.

In step S80, the camera control unit 16 starts the detection coordinate process. More specifically, when the image pickup apparatus 1 is in a touch focusing process mode in which image pickup apparatus 1 performs a focusing operation using a touch operation on a screen, the camera control unit 16 starts the focusing operation.

In step S81, the coordinate information is input from the HI control unit 20 to the camera control unit 16. That is, the coordinate information input from the HI control unit 20 corresponds to the information output from the HI control unit 20 to the camera control unit 16 in step S75 shown in FIG. 21.

In step S82, the camera control unit 16 determines whether the coordinate information is present. More specifically, if the coordinate information is present ("Yes" in step S82), the camera control unit 16 determines that the touch panel is touched, and therefore, the processing proceeds to step S83. However, if the coordinate information is not present ("No" in step S82), the camera control unit 16 determines that the touch panel is not touched, and therefore, the processing proceeds to step S84. Note that, in order to determine whether the touch panel is touched, the camera control unit 16 may use a flag indicating whether the touch panel is touched.

In step S83, the camera control unit 16 determines to employs the coordinates of the touched point received from the HI control unit 20 as the detection coordinates.

In step S84, since coordinate information is not present, the camera control unit 16 employs the detection coordinates in a normal mode. That is, the camera control unit 16 uses the default frame position as the detection coordinates.

In step S85, the camera control unit 16 completes the detection coordinate process.

As described above, according to the image pickup apparatus 1, when the image pickup apparatus 1 automatically detects a plurality of objects in the screen, the image pickup apparatus 1 detects the amount of motion of an object that the user selects. In this way, the case in which the objects are prioritized despite the user's intention can be prevented. That is, the image pickup apparatus 1 can perform a ranging operation as the user desires.

The present application contains subject matter related to that disclosed in Japanese Priority Patent Applications JP 2008-110746 filed in the Japan Patent Office on Apr. 21, 2008, and JP 2008-325883 filed in the Japan Patent Office on Dec. 22, 2008, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
    a motion amount detecting unit configured to detect an amount of motion of at least one object on the basis of an image signal of the object;
    a type information storage unit configured to store a plurality of type information items used for detecting the type of the object;
    a type detecting unit configured to detect the type of the object on the basis of the plurality of type information items stored in the type information storage unit and the image signal of the object;
    a moving distance estimating unit configured to estimate a distance through which the object moves in an imaging screen on the basis of the amount of motion of the object detected by the motion amount detecting unit and the type of the object detected by the type detecting unit; and
    a ranging area control unit configured to control a size of a ranging area on the basis of the distance through which the object moves in the imaging screen estimated by the moving distance estimating unit, the ranging area control unit changing the size of the ranging area such that when the type of the object is a human being, the ranging area is increased in size and an increase in a horizontal direction is greater than an increase in a vertical direction;
    wherein the ranging area control unit changing the size of the ranging area such that when the type of the object is a human child, the ranging area is increased in size in the horizontal direction an equal amount on each side of the ranging area, and the ranging area control unit changing the size of the ranging area such that when the type of the object is a human adult, the ranging area is increased in size in the horizontal direction a greater amount on a side toward which the adult is moving then a side that the adult is moving away from.

2. The image pickup apparatus according to claim 1, wherein, when a plurality of the objects are detected, the ranging area control unit controls the size of the ranging area on the basis of a distribution of the plurality of the objects.

3. The image pickup apparatus according to claim 1, wherein, if the amount of motion detected by the motion amount detecting unit is less than or equal to a predetermined value, the ranging area control unit fixes the size of the ranging area to a predetermined size.

4. The image pickup apparatus according to claim 1, wherein, the moving distance estimating unit corrects the estimated moving distance of the object in accordance with a focal length.

5. The image pickup apparatus according to claim 1, wherein, when a plurality of the objects are detected, the moving distance estimating unit assigns a weight to each of the objects in accordance with a size of the object and computes the estimated moving distance of the object.

6. The image pickup apparatus according to claim 1, further comprising:
    a display unit configured to display an image of the object;
    a selection unit configured to select the image of the object displayed on the display unit in accordance with a user operation; and
    a selection point detecting unit configured to detect the motion of the object selected by the selection unit;
    wherein the motion amount detecting unit detects an amount of motion of the object detected by the selection point detecting unit.

7. A method for controlling a ranging area, comprising:
    detecting an amount of motion of an object on the basis of an image signal of the object;
    detecting a type of object on the basis of the image signal of the object;
    estimating a distance through which the object moves in an imaging screen on the basis of the detected amount of motion of the object; and
    controlling a size of a ranging area on the basis of the estimated distance through which the object moves in the imaging screen, the controlling including changing the size of the ranging area such that when the type of the object is a human being, the ranging area is increased in size and an increase in a horizontal direction is greater than an increase in a vertical direction;
    wherein the controlling changes the size of the ranging area such that when the type of the object is a human child, the ranging area is increased in size in the horizontal direction an equal amount on each side of the ranging area, and the controlling changes the size of the ranging area such that when the type of the object is a human adult, the ranging area is increased in size in the horizontal direction a greater amount on a side toward which the adult is moving then a side that the adult is moving away from.

* * * * *